US00RE40759E

(19) United States
(12) Reissued Patent
Wassenhoven et al.

(10) Patent Number: US RE40,759 E
(45) Date of Reissued Patent: Jun. 23, 2009

(54) SPINNING ROTOR FOR OPEN-END SPINNING MACHINES

(75) Inventors: Heinz-Georg Wassenhoven, Möenchengladbach (DE); Hans Grecksch, Möenchengladbach (DE); Bert Schlömer, Heinsberg (DE); Brigitte Riede, Möenchengladbach (DE); Elisabeth Klaczynski, Wegberg (DE)

(73) Assignee: Oerlikon Textile GmbH & Co. KG, Remscheid (DE)

(21) Appl. No.: 10/383,207
(22) Filed: Mar. 6, 2003

Related U.S. Patent Documents

Reissue of:
(64) Patent No.: 6,195,976
Issued: Mar. 6, 2001
Appl. No.: 09/521,369
Filed: Mar. 8, 2000

(30) Foreign Application Priority Data

Mar. 9, 1999 (DE) ..... 199 10 277

(51) Int. Cl.
*D01H 4/00* (2006.01)

(52) U.S. Cl. ..... 57/414; 57/416
(58) Field of Classification Search ..... 57/404, 57/408, 411, 413, 414, 416, 417
See application file for complete search history.

(56) References Cited

U.S. PATENT DOCUMENTS

| | | | | | |
|---|---|---|---|---|---|
| 3,520,122 | A | | 7/1970 | Sheperd | 57/416 |
| 3,822,541 | A | | 7/1974 | Croasdale et al. | 57/58.89 |
| 4,167,846 | A | | 9/1979 | Shaw et al. | 57/58.89 |
| 4,170,102 | A | | 10/1979 | Whiteley | 57/58.89 |
| 4,237,682 | A | * | 12/1980 | Miyamoto | 57/416 |
| 4,241,572 | A | * | 12/1980 | Le Chatelier | 57/416 |
| 4,299,084 | A | | 11/1981 | Seiki et al. | 57/58.89 |
| 4,492,077 | A | | 1/1985 | Raasch et al. | 57/414 |
| 4,662,170 | A | | 5/1987 | Raasch | 57/416 |
| 4,663,929 | A | | 5/1987 | Raasch et al. | 57/416 |
| 4,663,930 | A | | 5/1987 | Landwehrkamp | 57/416 |
| 4,777,813 | A | | 10/1988 | Hoffmann et al. | 72/85 |
| 5,526,638 | A | | 6/1996 | Bock et al. | 57/404 |
| 5,622,040 | A | * | 4/1997 | Preutenborbeck et al. | 57/406 |
| 5,718,110 | A | | 2/1998 | Stahlecker | 57/416 |
| 5,816,040 | A | | 10/1998 | Stahlecker | 57/414 |
| 5,893,264 | A | | 4/1999 | Stahlecker | 57/416 |
| 5,959,383 | A | | 9/1999 | Winzen et al. | 310/90.5 |
| 6,012,278 | A | * | 1/2000 | Schermer | 57/416 |
| 6,062,015 | A | | 5/2000 | Schürmann et al. | 57/414 |

FOREIGN PATENT DOCUMENTS

| | | |
|---|---|---|
| DE | 29 09 739 A1 | 9/1980 |
| DE | 26 29 161 C2 | 1/1998 |
| DE | 197 34 637 A1 | 6/1998 |
| EP | 0 099 490 B1 | 2/1984 |
| WO | WO 79/00659 | 9/1979 |

OTHER PUBLICATIONS

German Search Report.

* cited by examiner

*Primary Examiner*—Shaun R Hurley
(74) *Attorney, Agent, or Firm*—K&L Gates LLP

(57) ABSTRACT

A spinning rotor for use at high speeds in open-end spinning machines has a rotor cup having an annular wall portion defining a rotor opening, a bottom wall portion merging with the annular wall portion, and a mounting hub extending exteriorly from the bottom wall portion. A rotor shaft is affixed to the mounting hub coaxially with the rotor cup. The merger of the bottom and annular wall portions of the rotor cup defines a maximum exterior diameter of the rotor and an interior rotor groove. The annular wall portion, the bottom wall portion and the mounting hub are of different cross-sectional thicknesses with the cross-sectional thickness of the bottom wall portion increasing from the rotor groove to the mounting hub. The wall thickness is less than 1.2 mm in the area of the maximum exterior diameter of the rotor cup (2) and the rotor cup has an aerodynamic exterior contour free of edges for deterring turbulent boundary layer air flow thereabout and an interior contour for promoting fiber spinning into a yarn.

42 Claims, 1 Drawing Sheet

SPINNING ROTOR FOR OPEN-END SPINNING MACHINES

Matter enclosed in heavy brackets [ ] appears in the original patent but forms no part of this reissue specification; matter printed in italics indicates the additions made by reissue.

CROSS-REFERENCES TO RELATED APPLICATIONS

This application claims the benefit of German patent application DE19910277.5, filed Mar. 9, 1999, herein incorporated by reference.

BACKGROUND OF THE INVENTION

The present invention relates to a spinning rotor for open-end spinning machines and, more particularly, to a spinning rotor which basically comprises a rotor cup having an annular wall portion defining a rotor opening, a bottom wall portion merging with the annular wall portion, and a mounting hub extending exteriorly from the bottom wall portion, with a rotor shaft affixed to the mounting hub coaxially with the rotor cup.

The requirement for greater and greater productivity has resulted in the development of current open-end rotor spinning machines operating at rotor speeds of well above 100,000 rpms. At such high speeds, special requirements arise as regards imbalance, bearing and stability (danger of bursting) of the spinning rotors.

European Patent Document EP 0 099 490 B1 describes an open-end spinning rotor shaped in a non-cutting manner and with a fiber collector groove to be used at high rotor speeds. In order to avoid the negative effects of centrifugal forces occurring at high rotor speeds such as, e.g., deformation or bursting of the spinning rotor, a bead is formed on the outer circumference of the edge of the rotor cup opening in order to increase the strength. This reinforcement is intended to increase the bursting speed of the rotor.

German Patent Publication DE 197 34 637 A1 discloses a spinning rotor of an open-end rotor spinning machine having a rotor shaft supported in the bearing slot of a support disk bearing arrangement and in an axial bearing which comprises magnetic bearing components. The spinning rotor is intended for rotor speeds of more than 100,000 rpms. This spinning rotor has a distinctly greater wall thickness in the area of the rotor groove or in the area of the greatest outside diameter of the rotor than in the area between the rotor groove and the opening edge. The stability of a body of rotation is increased with a greater wall thickness and any occurring tensions resulting from high speeds can be better distributed. Such embodiments are customary and are frequently used.

Spinning rotors which are reinforced or designed with a great wall thickness in the area of the greatest diameter have absolutely contributed to a certain increase of the speed. However, further increases in speed without losses of function or of safety can not be achieved with these known spinning rotors or can be achieved only in a very limited manner. In particular, problems of imbalance can be produced in that a slight deviation of measurement occurring in the course of the manufacture of the spinning rotor results in the case of rather large diameters or rather large masses in a greater imbalance.

SUMMARY OF THE INVENTION

It is accordingly an object of the present invention to improve spinning rotors for use at high speeds.

The invention achieves this objective by providing a spinning rotor for open-end spinning machines which basically comprises a rotor cup having an annular wall portion defining a rotor opening, a bottom wall portion merging with the annular wall portion, and a mounting hub extending exteriorly from the bottom wall portion, and a rotor shaft affixed to the mounting hub coaxially with the rotor cup. The merger of the bottom and annular wall portions of the rotor cup defines thereat a maximum exterior diameter of the rotor cup and defines interiorly thereof a rotor groove. The annular wall portion, the bottom wall portion and the mounting hub are of different cross-sectional thicknesses and the cross-sectional thickness of the bottom wall portion increases from the rotor groove to the mounting hub. In accordance with the present invention, the wall thickness at the maximum exterior diameter of the rotor cup at the merger of the bottom and annular wall portions of the rotor cup is between about 0.3 mm and about 1.2 mm, and the annular wall portion, the bottom wall portion and the mounting hub have an aerodynamic exterior contour free of edges for deterring turbulent boundary layer air flow thereabout while the annular wall portion and the bottom wall portion have an interior contour for promoting fiber spinning into a yarn.

The described design of the present invention providing the rotor cup with a slight wall thickness in the area of its greatest outside diameter improves the distribution of mass and therewith the behavior at high speeds of the rotor cup without inadmissibly weakening the rotor cup in this area. A reduction of weight is thereby possible which has an advantageous effect on the operating qualities of the spinning rotor and on the consumption of energy.

Preferably, the exterior contour of the rotor cup from the rotor opening through the annular wall portion to the transition of the bottom wall portion into the mounting hub is configured to provide only convex curvatures as viewed with respect to the axis of rotation of the rotor cup, which provides for favorable air flow about the rotor. More specifically, the outer contour of annular wall portion is a straight line from the rotor opening to the merger thereof with the bottom wall portion at which a convex curvature in the outer contour merges the annular wall portion with the bottom wall portion. In addition, the ratio of the diameter of the rotor opening to the rotor depth between the rotor opening and the rotor groove has a favorable effect on the surrounding air flow during high speed operation of the rotor.

In order to optimize the compensation of mechanical tension forces acting on the rotor cup and therewith improve the strength of the rotor cup, the wall thickness constantly increases from the rotor opening of the rotor cup to the rotor groove, the rotor groove has a radius in the groove bottom which radius is at least 0.15 mm large, and furthermore, the ratio of the diameter of the rotor opening to the rotor depth is between about 2:1 and 5:1. The danger of a bursting of the rotor cup can be thereby reduced and an increase of the bursting danger countered in spite of an increase in rotor speed.

A marking introduced by the removal of material, preferably by etching or laser, from the exterior surface of the rotor cup simplifies identification during the manufacturing process as well as during operation and is more permanent than an application of colorant, which frequently becomes illegible or disappears entirely after a short period of operation, e.g., due to contact or the action of friction. The removal of material for introducing the marking on the surface of the spinning rotor may serves at the same time to selectively balance out or compensate the mass of the spinning rotor, thereby advantageously making possible an improved rotational behavior of the spinning rotor at high speeds, and also saves expense and time in the manufacturing process of the spinning rotor.

In light of the teachings of the known state of the art that an increase of the rotor wall thickness should be made in order to be able to increase the rotational speeds without loss of function, it is surprising that the spinning rotor of the present invention with a reduced wall thickness in the area of the greatest outside rotor diameter is better suited for high speeds of up to 150,000 rpms and permits an increase in the speed of up to 25,000 rpms as a function of the nominal rotor diameter in comparison to known spinning rotors. Such increases in the rotor speeds by more than 20,000 rpms can be achieved especially with nominal rotor diameters between 33 mm and 40 mm. The increase in speed made possible by this design of the spinning rotor in accordance with the present invention permits a distinct increase in productivity of the open-end spinning positions and of the open-end spinning machines and, therewith, an economical manufacture of yarn.

The reduction of the outside rotor diameter in conjunction with the formation of the exterior contour of the rotor cup to be free of sharp edges, depressions and protrusions, results in a significant reduction of the air resistance of the rotor cup and turbulence in the surrounding air flow at such high speeds. This can reduce the consumption of energy by up to 7 watts per spinning position. This results in open end spinning machines normally designed as multi-position textile machines in a significant cost savings per machine, in the energy cost alone of up to 2,000 DM per year.

It is also surprising that such advantageous effects can be achieved with the relatively small change in the area of the greatest outside diameter of the rotor cup in combination with the further features in accordance with the invention. Improved balance properties of the spinning rotor of the invention result in improved operating behavior of the spinning rotors, drive elements and bearings and therewith in greater operational safety and a higher degree of utilization. This also beings about an increase in productivity.

Further details, features and advantages of the invention will be understood from the following disclosure of a preferred embodiment of the invention in conjunction with the accompanying drawing figures.

DESCRIPTION OF THE PREFERRED EMBODIMENT

Figure 1:
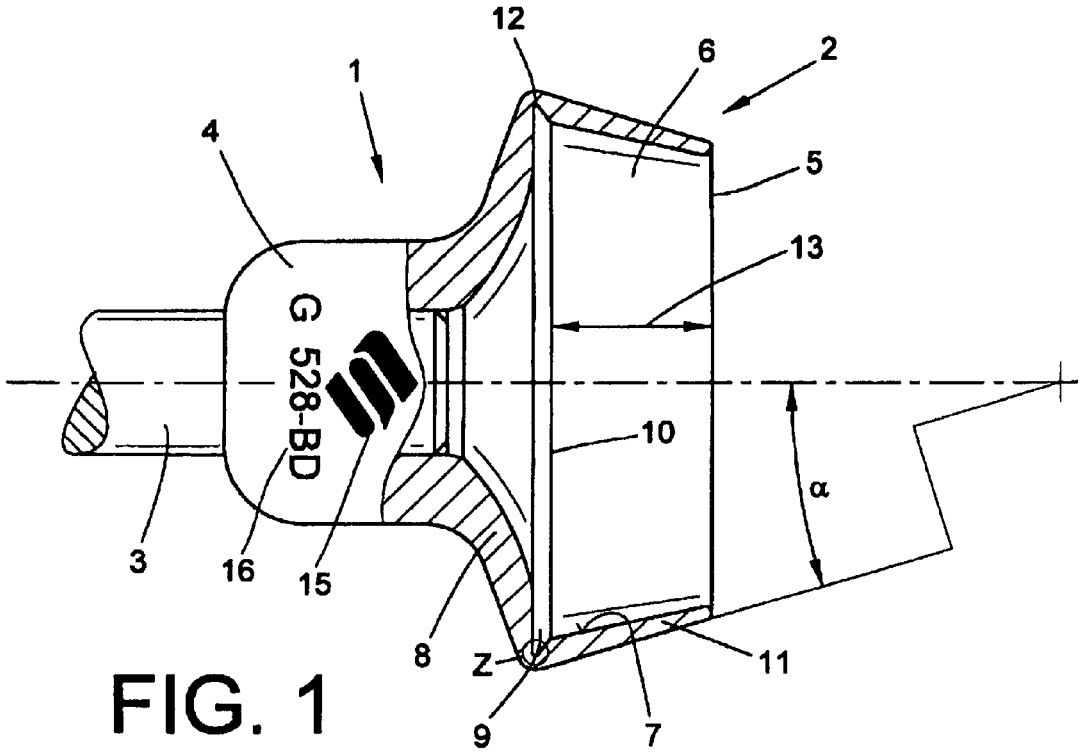
FIG. 1 is a side elevational view, partially in axial cross-section, of a pinning rotor in accordance with a preferred embodiment of the present invention.

Referring now to the accompanying drawings, FIG. 1 shows a spinning rotor 1 having a rotor cup 2 formed by a turning or like process from a solid block of appropriate material and fastened onto a rotor shaft 3. Alternatively, rotor cup 2 can also be formed into the desired shape by a casting process or in a non-cutting manner by a machining process. The rotor has a hub 4 for fastening of rotor cup 2 on rotor shaft 3. The interior area 6 of rotor cup 2 widens conically from an opening 5 opposite the hub 4 and is defined by an inner side acting as a fiber glide surface 7 extending from the opening 5 to a rotor groove 9 extending circumferentially about the rotor bottom wall portion 8 to function as a fiber collector groove. Fiber glide surface 7 and rotor groove 9 form an annular edge 10 at their interface with one another. Rotor groove 9 is located at depth 13, measured from opening 5 to the edge 10. The ratio of the diameter of opening 5 to depth 13 is approximately 2.8:1.

The annular wall portion 11 of rotor cup 2 between opening 5 and rotor groove 9 is formed of a cross-sectional wall thickness which uniformly increases from opening 5 in the direction of rotor groove 9. Both the angular orientation of wall portion 11 at an acute angle of inclination $\alpha$ to the axis of the rotor 1 and the length of this wall portion 11 contribute to the favorable rotational behavior of the spinning rotor 1 at high speeds. The outer contour of the rotor cup 2 is configured to provide only convex curvatures in the axial direction from the rotor opening 5 along the annular and bottom wall portions 11, 8 and to the transition from the bottom wall portion 8 into the hub 4. The shape and increasing cross-sectional thickness of wall portion 11 results in a good distribution of the material tensions caused by the centrifugal forces and counteracts inadmissibly high tensions in the material. The 5 stability of this spinning rotor 1 in combination with a design of fiber glide surface 7 and of rotor groove 9 which is favorable from the standpoint of textile technology permits a yarn to be produced with operational safety and uniformly high quality.

Rotor cup 2 has its greatest outside diameter as well as its minimum wall thickness 14 in the area of rotor groove 9, the wall thickness 14 preferably being about 0.8 mm at this position. Rotor groove 9 has a V-shaped configuration with a radius 12, preferably of approximately 0.2 mm, at the bottom of the groove.

Figure 2:
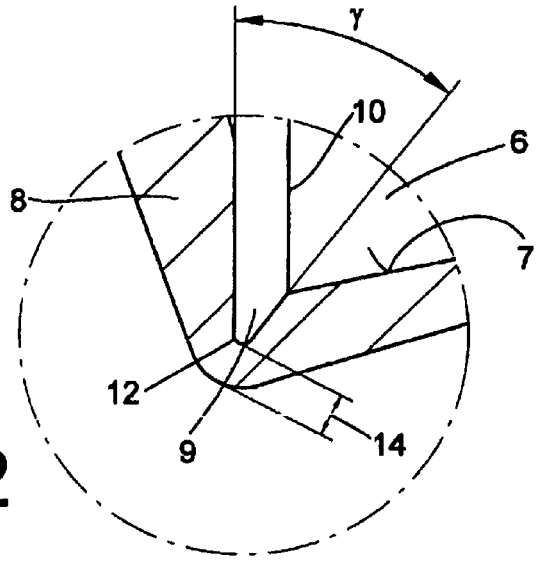
FIG. 2 is a detailed view of the spinning rotor of FIG. 1 at the location Z thereof.

FIG. 2 shows the above-described area of the greatest outside diameter of rotor cup 2 in a view enlarged in comparison to FIG. 1. Rotor groove 9 which is designed to be V-shaped at an angle $\gamma$ of approximately 40 degrees and with radius 12 forms the inner wall surface of rotor cup 2 at the position of the minimum wall thickness.

The wall thickness increases in the area of rotor bottom wall portion 8 from rotor groove 9 in the direction of hub 4 at which rotor bottom wall portion 8 merges into hub 4. The entire outside contour of rotor cup 2 is rounded and free of sharp edges, depressions or protrusions so as to favorably enhance boundary-layer air flow and the aerodynamic behavior of the rotor. The outer surface of rotor cup 2 carries marks for the identification and marking of spinning rotor 1 in the form of picture mark 15 and inscription 16. Picture mark 15 and inscription 16 are produced on the surface by the removal of material to a very low depth and covers a sufficient area to provide a balancing function on the spinning rotor 1. This can eliminate the otherwise customary grinding of spinning rotors on their outside circumference and thus can eliminate an intervention into the outer contour of spinning rotor 1 which could possibly be unfavorable to boundary-layer air flow.

Further embodiments of spinning rotor 1 in accordance with the invention can be alternatively used. In particular, a plurality of shaping variants of the inner and outer contour in wall portion 11 are possible within the scope of the invention.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A spinning rotor for open-end spinning machines, comprising:

(a) a rotor cup having, (i) an annular wall portion defining a rotor opening, (ii) a bottom wall portion merging with the annular wall portion to define at the merger thereof a maximum exterior diameter of the rotor cup and in the interior thereof a rotor groove, the wall thickness at the maximum exterior diameter of the rotor cup at the merger of the bottom and annular wall portions being between about 0.3 mm and less than 1.0 mm, and less than a wall thickness of the annular wall, and (iii) a mounting hub extending exteriorly from the bottom wall portion, the cross-sectional thickness of the bottom wall portion increasing from the rotor groove to the mounting hub; and (b) a rotor shaft affixed to the mounting hub coaxially with the rotor cup.

2. The spinning rotor according to claim 1, characterized in that the wall thickness at the maximum exterior diameter of the rotor cup at the merger of the bottom and annular wall portions of the rotor cup is between about 0.75 mm and about 0.85 mm.

3. The spinning rotor according to claim 1, characterized in that an exterior contour of the rotor cup defined by the annular wall position and bottom wall position comprises only convex curvatures.

4. The spinning rotor according to claim 1, characterized in that the cross-sectional thickness of the annular wall portion constantly increases from the rotor opening to the merger of the bottom and annular wall portions of the rotor cup.

5. The spinning rotor according to claim 1, characterized in that an exterior contour defined by the annular wall portion is a straight line from the rotor opening to the merger of the bottom and annular wall portions of the rotor cup.

6. The spinning rotor according to claim 1, characterized in that the wall thickness at the maximum exterior diameter of the rotor cup at the merger of the bottom and annular wall portions of the rotor cup and exterior and interior contours of the rotor cup are designed to distribute the mass of the rotor cup for accommodating tensions at the merger of the bottom and annular wall portions of the rotor cup at high rotational operating speeds of the rotor.

7. The spinning rotor according to claim 1, characterized in that the ratio of the diameter of the rotor opening to a rotor depth between the rotor opening and the rotor groove is between about 2:1 and about 5:1.

8. The spinning rotor according to claim 1, characterized in that the rotor groove has a radius in a bottom of the groove of at least about 0.15 mm.

9. The spinning rotor according to claim 1, characterized in that at least one marking is formed in an exterior contour of the rotor cup by removal of material from the rotor cup.

10. The spinning rotor according to claim 9, characterized in that the removal of material for forming the marking is selectively made for balancing the spinning rotor.

11. The spinning rotor of claim 1, wherein the cross-sectional thickness of the bottom wall portion continually increases from the merger of the bottom wall portion to the mounting hub.

12. The spinning rotor of claim 1, wherein indicia is formed on the exterior contour of the rotor cup by removal of material from the rotor cup forming a cavity therein.

*13. A spinning rotor for open-end spinning machines, comprising:*

*(a) a rotor cup having*

*(i) an annular wall portion defining a rotor opening,*

*(ii) a bottom wall portion merging with the annular wall portion to define at the merger thereof a maximum exterior diameter of the rotor cup and in the interior thereof a rotor groove, the wall thickness at the maximum exterior diameter of the rotor cup at the merger of the bottom and annular wall portions being between about 0.3 mm and no greater than 1.19 mm and less than a wall thickness of the annular wall,*

*(iii) the wall thickness of the annular wall increasing toward the merger, and*

*(iv) a mounting hub extending exteriorly from the bottom wall portion, the cross-sectional thickness of the bottom wall portion continually increasing from the rotor groove to the mounting hub; and*

*(b) a rotor shaft affixed to the mounting hub coaxially with the rotor cup.*

*14. The spinning rotor according to claim 13, characterized in that the wall thickness at the merger is between about 0.75 mm and about 0.85 mm.*

*15. The spinning rotor according to claim 13, characterized in that an exterior contour of the rotor cup defined by the annular wall portion and bottom wall portion comprises only convex curvatures.*

*16. The spinning rotor according to claim 13, characterized in that an exterior contour defined by the annular wall portion is a straight line from the rotor opening to the merger of the bottom and annular wall portions of the rotor cup.*

*17. The spinning rotor according to claim 13, characterized in that the wall thickness at the merger and exterior and interior contours of the rotor cup are designed to distribute the mass of the rotor cup for accommodating tensions at the merger at high rotational operating speeds of the rotor.*

*18. The spinning rotor according to claim 13, characterized in that the ratio of the diameter of the rotor opening to a rotor depth between the rotor opening and the rotor groove is between about 2:1 and about 5:1.*

*19. The spinning rotor according to claim 13, characterized in that the rotor groove has a radius in a bottom of the groove of at least about 0.15 mm.*

*20. The spinning rotor according to claim 13, characterized in that at least one marking is formed in an exterior contour of the rotor cup by removal of material from the rotor cup.*

*21. The spinning rotor according to claim 20, characterized in that the removal of material for forming the marking is selectively made for balancing the spinning rotor.*

*22. The spinning rotor of claim 13, wherein indicia is formed on the exterior contour of the rotor cup by removal of material from the rotor cup forming a cavity therein.*

*23. A spinning rotor for open-end spinning machines, comprising:*

(*a*) *a rotor cup having*

(*i*) *an annular wall portion defining a rotor opening,*

(*ii*) *a bottom wall portion merging with the annular wall portion to define at the merger thereof a maximum exterior diameter of the rotor cup and in the interior thereof a rotor groove, the wall thickness at the maximum exterior diameter of the rotor cup at the merger of the bottom and annular wall portions being between about 0.3 mm and no greater than 1.19 mm and less than a wall thickness of the annular wall, and*

(*iii*) *a mounting hub extending exteriorly from the bottom wall portion; and*

(*b*) *a rotor shaft affixed to the mounting hub coaxially with the rotor cup.*

*24. The spinning rotor according to claim 23, characterized in that an exterior contour of the rotor cup defined by the annular wall portion and bottom wall portion comprises only convex curvatures.*

*25. The spinning rotor according to claim 23, characterized in that an exterior contour defined by the annular wall portion is a straight line from the rotor opening to the merger of the bottom and annular wall portions of the rotor cup.*

*26. The spinning rotor according to claim 23, characterized in that the wall thickness at the maximum exterior diameter of the rotor cup at the merger of the bottom and annular wall portions of the rotor cup and exterior and interior contours of the rotor cup are designed to distribute the mass of the rotor cup for accommodating tensions at the merger of the bottom and annular wall portions of the rotor cup at high rotational operating speeds of the rotor.*

*27. The spinning rotor according to claim 23, characterized in that the ratio of the diameter of the rotor opening to a rotor depth between the rotor opening and the rotor groove is between about 2:1 and about 5:1.*

*28. The spinning rotor according to claim 23, characterized in that the rotor groove has a radius in a bottom of the groove of at least about 0.15 mm.*

*29. The spinning rotor according to claim 23, characterized in that at least one marking is formed in an exterior contour of the rotor cup by removal of material from the rotor cup.*

*30. The spinning rotor according to claim 29, characterized in that the removal of material for forming the marking is selectively made for balancing the spinning rotor.*

*31. The spinning rotor of claim 23, wherein indicia is formed on the exterior contour of the rotor cup by removal of material from the rotor cup forming a cavity therein.*

*32. A spinning rotor for open-end spinning machines, comprising:*

(*a*) *a rotor cup having*

(*i*) *an annular wall portion defining a rotor opening,*

(*ii*) *a bottom wall portion merging with the annular wall portion to define at the merger thereof a maximum exterior diameter of the rotor cup and in the interior thereof a rotor groove,*

(*iii*) *a wall thickness of the annular wall portion increasing toward the merger,*

(*iv*) *a mounting hub extending exteriorly from the bottom wall portion, and*

(*v*) *the rotor groove producing a wall thickness at the merger less than the narrowest thickness of the bottom wall; and*

(*b*) *a rotor shaft affixed to the mounting hub coaxially with the rotor cup.*

*33. The spinning rotor according to claim 32, characterized in that the wall thickness at the merger is between about 0.75 mm and about 0.85 mm.*

*34. The spinning rotor according to claim 32, characterized in that an exterior contour of the rotor cup defined by the annular wall portion and bottom wall portion comprises only convex curvatures.*

*35. The spinning rotor according to claim 32, characterized in that the cross-sectional thickness of the annular wall portion constantly increases from the rotor opening to the merger.*

*36. The spinning rotor according to claim 32, characterized in that an exterior contour defined by the annular wall portion is a straight line from the rotor opening to the merger of the bottom and annular wall portions of the rotor cup.*

*37. The spinning rotor according to claim 32, characterized in that the wall thickness at the merger and exterior and interior contours of the rotor cup are designed to distribute the mass of the rotor cup for accommodating tensions at the merger at high rotational operating speeds of the rotor.*

*38. The spinning rotor according to claim 32, characterized in that the ratio of the diameter of the rotor opening to a rotor depth between the rotor opening and the rotor groove is between about 2:1 and about 5:1.*

*39. The spinning rotor according to claim 32, characterized in that the rotor groove has a radius in a bottom of the groove of at least about 0.15 mm.*

*40. The spinning rotor according to claim 32, characterized in that at least one marking is formed in an exterior contour of the rotor cup by removal of material from the rotor cup.*

*41. The spinning rotor according to claim 40, characterized in that the removal of material for forming the marking is selectively made for balancing the spinning rotor.*

*42. The spinning rotor of claim 32, wherein indicia is formed on the exterior contour of the rotor cup by removal of material from the rotor cup forming a cavity therein.*

* * * * *